United States Patent [19]

Clatty et al.

[11] Patent Number: 5,401,824
[45] Date of Patent: Mar. 28, 1995

[54] STORAGE STABLE ISOCYANATE-REACTIVE COMPOSITIONS FOR USE IN FLAME-RETARDANT SYSTEMS

[75] Inventors: Jan L. R. Clatty, Monaca, Pa.; Michael T. Wellman, Moundsville, W. Va.; Sanjeev Madan, Coraopolis, Pa.

[73] Assignee: Miles Inc., Pittsburgh, Pa.

[21] Appl. No.: 301,741

[22] Filed: Sep. 6, 1994

Related U.S. Application Data

[62] Division of Ser. No. 182,993, Jan. 14, 1994, Pat. No. 5,374,486, which is a division of Ser. No. 111,099, Aug. 24, 1993, Pat. No. 5,302,303.

[51] Int. Cl.⁶ .................. C08G 18/16; C08G 18/18; C08G 18/28
[52] U.S. Cl. ........................ 528/53; 528/71; 528/77; 528/78; 528/85; 521/51
[58] Field of Search .............. 528/53, 71, 77, 78, 528/85

[56] References Cited

U.S. PATENT DOCUMENTS

| | | | |
|---|---|---|---|
| 5,171,818 | 12/1992 | Wilson | 528/77 |
| 5,250,649 | 10/1993 | Onwumere et al. | 528/77 |
| 5,319,057 | 6/1994 | Sakae | 528/77 |

Primary Examiner—Morton Foelak
Attorney, Agent, or Firm—Joseph C. Gil; Richard E. L. Henderson

[57] ABSTRACT

This invention relates to stabilizing isocyanate-reactive compositions containing flame retardants by the use of certain tertiary amines or ammonium compounds, in which said stabilized compositions are prepared by mixing (a) at least one isocyanate-reactive compound having a molecular weight of 400 to 10,000 and a functionality of 2 to 7;
  (b) at least one isocyanate-reactive compound having a molecular weight of less than 399 and a functionality of 2 to 6;
(c) at least one (i) isocyanate-reactive tertiary amine polyether, (ii) fatty amido-amine, and/or (iii) ammonium salt derivative of a fatty amido-amine;
(d) a flame retardant;
(e) a catalyst; and
(f) optional additives.

This invention also relates to urethane-based products prepared by reaction of organic polyisocyanates with such compositions.

13 Claims, No Drawings

5,401,824

STORAGE STABLE ISOCYANATE-REACTIVE COMPOSITIONS FOR USE IN FLAME-RETARDANT SYSTEMS

This application is a division of application Ser. No. 08/182,993, filed Jan. 14, 1994, now U.S. Pat. No. 5,374,486, which is a divisional of application Ser. No. 08/111,099, filed Aug. 24, 1993, now U.S. Pat. No. 5,302,303.

BACKGROUND OF THE INVENTION

This invention relates to storage stable isocyanate-reactive compositions containing certain tertiary amine or ammonium compounds that are useful in the preparation of urethane-based products.

Shelf-life stability of isocyanate-reactive compositions, as measured by change in reactivity with isocyanates, is often adversely affected by the addition of flame retardants, especially those based on phosphorus, zinc, antimony, and aluminum. An object of the present invention was to obtain isocyanate-reactive compositions containing flame retardants having shelf-life stabilities comparable to or better than those of compositions not containing flame retardants. It has now been found that the use of certain tertiary amine or ammonium compounds provides such improved storage stability.

SUMMARY OF THE INVENTION

This invention relates to storage-stable isocyanate-reactive compositions containing flame retardants comprising
 (a) about 10 to about 90 percent by weight, based on the total of components (a), (b), (c), (d), and (e), of at least one isocyanate-reacttve compound having a molecular weight of 400 to about 10,000 and a functionality of about 2 to about 7 (preferably 2 to 4);
 (b) about 0.6 to about 67 percent by weight, based on the total of components (a), (b), (c), (d), and (e), of at least one isocyanate-reactive compound having a molecular weight of less than 399 and a functionality of about 2 to about 6 (preferably 2 to 4);
 (c) about 0.7 to about 30 percent by weight, based on the total of components (a), (b), (c), (d), and (e), of a tertiary amine or ammonium compound selected from the group consisting of
  (i) an isocyanate-reactive tertiary amine polyether having a molecular weight of from about 100 to about 1000 and having the formula $R[NR^1R^2]_m$ 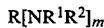

wherein
 R is saturated or unsaturated $C_2$-$C_8$ aliphatic or $C_2$-$C_8$ aliphatic substituted with —OH, —SH, or $NHR^a$ wherein $R^a$ is $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH, or $NHR^a$ wherein $R^a$ is alkyl or alkenyl; or five- or six-membered aromatic or heteroaromatic optionally substituted with $C_1$-$C_8$ alkyl, $C_1$-$C_8$alkoxy, halogen, cyano, nitro, $C_1$-$C_8$ alkylene, —OH, —SH, or $NHR^a$ wherein $R^a$ is $C_1$-$C_8$ alkyl or $C_2$-$C_8$ alkenyl;
 $R^1$ and $R^2$ are independently polyether groups terminated with isocyanate-reactive groups selected from —OH, —SH, and $NHR^b$ wherein $R^b$ is $C_1$-$C_8$ alkyl or $C_2$-$C_8$ alkenyl (preferably hydroxy-terminated polyether groups containing polypropylene oxide units); and
 m is an integer of from 1 to 4 (preferably 2 to 4);
  (ii) a fatty amido-amine;
  (iii) an ammonium salt derivative of a fatty amtdo-amine; and
  (iv) mixtures thereof;
 (d) about 5 to about 55 percent by weight, based on the total of components (a), (b), (c), (d), and (e), of a flame retardant (preferably comprising phosphonates, phosphites, phosphates, zinc borates, alumina trihydrate, antimony oxides, halogen-containing compounds, and mixtures thereof);
 (e) about 0.007 to about 6 percent by weight, based on the total of components (a), (b), (c), (d), and (e), of a catalyst selected from tertiary amines, organic metal compounds (preferably tin and bismuth compounds), and mixtures thereof; and
 (f) 0 to about 15 percent by weight, based on the total of components (a), (b), (c), (d), and (e), of additives (preferably one or more blowing agents, acid scavengers, internal mold release agents, surfactants, defoaming agents, and/or water scavengers).

This invention also relates to the method of stabilizing isocyanate-reactive compositions.

This invention further relates to isocyanate addition products containing flame retardants prepared by the reaction of such isocyanate-reactive compositions with organic polyisocyanates.

DETAILED DESCRIPTION OF THE INVENTON

Suitable isocyanate-reactive compounds (a) for use according to the present invention having a molecular weight of 400 to about 10,000 include compounds containing amino groups, hydroxyl groups, thiol groups, or a combination thereof. Suitable such compounds include polyethers, polyesters, polyacetals, polycarbonates, polyesterethers, polyester carbonates, polythioethers, polyamides, polyesteramides, polystloxanes, polybutadienes, and polyacetones, and are described, for example, in German Offenlegungsschrift 2,832,253 at pages 11 to 20. Particularly preferred isocyanate-reactive compounds contain 2 to 4 reactive amino or hydroxyl groups.

Hydroxyl-containing polyethers are suitable for use as isocyanate-reactive component (a). Suitable hydroxyl-containing polyethers can be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2- or 1,3-propanediol, 1,2-, 1,3-, or 1,4-butanediol, glycerin, trimethylolpropane, pentaerythritol, 4,4′-dihydroxydiphenylpropane, aniline, 2,4- or 2,6-diaminotoluene, ammonia, ethanolamine, triethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Hydroxyl-containing polyesters are also suitable for use as isocyanate-reactive component (a). Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4-and 2,3-butanediol, 1,6-hexanediol, 1,8-octanediol, neopentyl glycol, 1,3- and 1,4-bis(hydroxymethyl) cyclohexane, 2-methyl -1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polyester carbonates include those prepared by the reaction of polyester diols, with or without other diols such as 1,3-propanediol, 1,4-butanediol, 1,6-hexanediol, diethylene glycol, triethylene glycol, tetraethylene glycol, or thiodiglycol, with phosgene, cyclic carbonates, or diaryl carbonates such as diphenyl carbonate. Suitable polyester carbonates more generally include compounds such as those disclosed in U.S. Pat. No. 4,430,484.

Suitable polythioethers include the condensation products obtained by the reaction of thiodiglycol, either alone or with other glycols, formaldehyde, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamine$, and mixtures thereof.

Although less preferred, other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights range from about 400 to about 10,000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the abovementioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume II, 1964, pages 5–6 and 198–199, and in *Kunststoff-Handbuch*, Volume VII, Vieweg-Höchtlen, Carl-Hanser-Verlag, Munich, 1966, on pages 45 to 71.

Suitable isocyanate-reactive compounds containing amino groups include the so-called amine-terminated polyethers containing primary or secondary (preferably primary) aromatically or aliphatically (preferably aliphatically) bound amino groups. Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxypolyethers suitable for the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are also preferred amine-terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595.

Other suitable amine-terminated polyethers include aminophenoxy-substituted polyethers described, for example, in European Patent Applications 288,825 and 268,849 and U.S. application Ser. No. 07/266,725 (filed Nov. 3, 1988).

The amine-terminated polyethers used in the present invention are in many cases mixtures with other isocyanate-reactive compounds having the appropriate molecular weight. These mixtures generally should contain (on a statistical average) two to four isocyanate reactive amino end groups.

Aminocrotonate-terminated derivatives of polyethers, as well as of other polyols described above, can be prepared from acetoacetate-modified polyethers as described, for example, in U.S. Pat. Nos. 5,066,824, and 5,151,470.

Suitable isocyanate-reactive compounds (b) have a molecular weight of less than 399 and a functionality of about 2 to about 6 (preferably 2 to 4) and are often referred to as chain extenders (functionality of about 2) or crosslinkers (functionality greater than 2). Such compounds contain hydroxyl groups, amino groups, thiol groups, or a combination thereof, and generally contain 2 to 8 (preferably 2 to 4) isocyanate-reactive hydrogen atoms.

The preferred hydroxyl-containing chain extenders and crosslinkers include glycols and polyols, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-l,3-propanediol, 2-methyl-l,3-propanediol, glycerol, trimethylolpropane, 1,2,6-hexanetriol, pentaerythritol, 1,2,4-butanetriol, and trimethylolethane.

Suitable chain extenders (b) also include hydroxyl-containing polyethers having a molecular weight of less than 399. Suitable hydroxyl-containing polyethers can be prepared, for example, by the methods discussed above for the hydroxy-containing polyethers of component (a) except that only lower molecular weight polyethers are used for component (b). Particularly suitable polyethers include polyoxyalkylene polyether polyols, such as polyoxyethylene diol, polyoxypropylene diol, polyoxybutylene diol, and polytetramethylene diol having the requisite molecular weights.

Amine chain extenders preferably contain exclusively aromatically bound primary or secondary (preferably primary) amino groups and preferably also contain alkyl substituents. Examples of such aromatic diamines include 1,4-diaminobenzene, 2,4- and/or 2,6-diaminotoluene, meta-xylene diamine, 2,4'-and/or 4,4'-diaminodiphenylmethane, 3,3'-dimethyl-4,4'-diaminodiphenylmethane, 1-methyl-3,5-bis(methylthio)-2,4- and/or -2,6-diaminobenzene, 1,3,5-triethyl-2,4-diaminobenzene, 1,3,5-triisopropyl-2,4-diaminobenzene, 1-methyl-3,5-diethyl-2,4-and/or -2,6-diaminobenzene, 4,6-dimethyl-2-ethyl-l,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Although generally less preferred, certain (cyclo)aliphatic diamines are also suitable. A particularly suitable (cyclo)aliphatic diamine is 1,3-bis(aminomethyl)cyclohexane. Such diamines may, of course, also be used as mixtures.

Suitable tertiary amine or ammonium compounds of component (c) include isocyanate-reactive tertiary amine polyethers, fatty amido-amines, ammonium derivatives of fatty amido-amines, and mixtures thereof.

Suitable isocyanate-reactive tertiary amine polyethers (c)(i) include compounds having the formula $$R[NR^1R^2]_m$$

wherein R, $R^1$, $R^2$, and m have the meanings given above.

The term "saturated or unsaturated $C_2$-$C_8$ aliphatic" as applied to group R of component (c)(i) refers to straight or branched chain hydrocarbon groups having from 2 to 8 carbon atoms attached to from 1 to 4 —$NR^1R^2$ groups (preferably such that no carbon atom is attached to two nitrogen atoms) and optionally containing carbon-carbon double bonds (with the proviso that no double-bonded carbon atom is attached directly to a nitrogen atom). For example, when m is 2, saturated or unsaturated $C_2$-$C_8$ aliphatic groups include linear ethylene, propylene, butylene, pentylene, hexylene, heptylene, and octylene groups, as well as the isomertc branched forms thereof. The term "saturated or unsaturated $C_5$-$C_8$ cycloaliphatic" as applied to group R of component (c)(i) refers to cyclopentane, cyclohexane, cycloheptane, and cyclooctane groups, as well as to $C_1$-$C_8$ alkyl derivatives thereof, that are attached to the —$NR^1R^2$ groups either directly to the ring carbon atoms or indirectly through the optional $C_1$-$C_8$ alkylene substituents (preferably such that no carbon atom is attached directly to two nitrogen atoms) and that optionally contain carbon-carbon double bonds in the cyclic moiety (preferably such that no double-bonded carbon atom is attached directly to a nitrogen atom). For example, when m is 2, preferred saturated or unsaturated $C_5$-$C_8$ cycloaliphatic groups include the various isomeric cyclopentylene, cyclohexylene, cycloheptylene, and cyclooctylene groups. Suitable but less preferred saturated or unsaturated $C_5$-$C_8$ cycloal iphatic groups include those in which at least one ring carbon atom is attached to the —$NR^1R^2$ groups indirectly through an optional $C_1$-$C_8$ alkylene substituent, such as groups in which m is 2 having the formulas

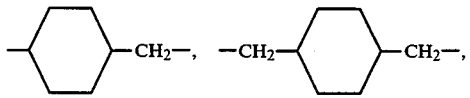

and the like. The term "five- or six-membered aromatic or heteroaromatic" as applied to group R of component (c)(i) refers to benzene, six-membered heterocyclic groups containing at least one ring nitrogen atom (such as pyridine, pyrazine, pyrimidine, pyridazine, and the like), and five-membered heterocyclic groups containing at least one ring nitrogen, oxygen, or sulfur atom (such as, furan, pyrrole, imidazole, pyrazole, thiophene, oxazole, isoxazole, thiazole, isothiazole, and the like), each of which can be substituted with $C_1$-$C_8$alkyl, $C_1$-$C_8$ alkoxy, halogen, cyano, nitro, or $C_1$-$C_8$ alkylene. When the substituent is $C_1$-$C_8$ alkylene, the aromatic or heteroaromatic group can be attached to the —$NR^1R^2$ groups indirectly through the alkylene substituents.

Each group R can optionally be substituted with —OH, —SH, or —$NHR^a$ groups wherein $R^a$ is $C_1$-$C_8$ alkyl or $C_2$-$C_8$ alkenyl (preferably alkenyl in which no double-bonded carbon atom is attached directly to a nitrogen atom), particularly when m is 1, to provide additional isocyanate-reactive sites. Examples of suitable such groups R when m is 1 include hydroxyethyl and hydroxypropyl. Such groups are generally not preferred when m is 2, 3, or 4.

The term "polyether groups terminated with isocyanate-reactive groups" as applied to groups $R^1$ and $R^2$ of component (c)(i) refers to polyethers prepared, for example, by the general methods described above for preparing isocyanate-reactive component (a), provided that one end of each polyether chain is attached to the nitrogen atom indicated in the formula and the other end is terminated by at least one —OH, —SH, or $NHR^b$ group and further provided that the molecular weight of the resultant tertiary amine polyether (c)(i) ranges from about 100 to about 1000. Suitable polyethers include hydroxy-terminated polyoxyalkylene polyethers, such as those having polyoxyethylene, polyoxypropylene, polyoxybutylene, or polytetramethylene groups, especially hydroxy-terminated polyoxyethylene groups.

Particularly preferred isocyanate-reactive tertiary amine polyethers (c)(i) are those in which R is a difunctional saturated $C_2$-$C_8$ aliphatic group, $R^1$ and $R^2$ are independently hydroxy-terminated polyethers containing exclusively polypropylene oxide units, and m is 2, and in which the molecular weight is from 200 to 600.

Suitable fatty amido-amines (c)(ii) include amides of a saturated or unsaturated $C_{12}$-$C_{24}$ fatty acid and a di-, tri-, or tetraaminoalkane (preferably an N-alkylated diaminoalkane) having at least one amide nitrogen atom and at least one basic amino group. It is also possible, although less preferred, to use fatty amido-amines having hydroxyl substituents. Preferred fatty amtdo-amtnes are compounds having the general formula

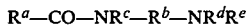

wherein $R^a$ is $C_{11}$-$C_{23}$ alkyl, alkenyl, alkadienyl, or alkatrienyl, $R^b$ is $C_2$-$C_8$ alkylene or alkenylene, and $R^c$ $R^d$ and $R^e$ are independently hydrogen or $C_1$-$C_8$ alkyl (preferably those in which $R^c$ is hydrogen and $R^d$ and $R^e$ are both $C_1$-$C_8$ alkyl). Suitable fatty amido-amines of this type include those in which $R^a$ is derived from stearic acid, commercial coconut fatty acid mixtures, tallow or train-oil fatty acids, commercial paraffin fatty acids ( including mixtures thereof), undecylenic acid, oleic acid, linoleic acid, tall oil fatty acids, ricinoleic acid, and the like. A particularly preferred fatty amidoamine is cocamidopropyldimethylamine (available as ADOGEN K-14 from Witco Corporation).

Suitable ammonium derivatives of fatty amidoamines (c)(iii) include fatty amido-amines (such as, for example, those described above for component (c)(ii)) in which at least one basic amino group is protonated or quaternized (for example, to form an N,N,N-trialkylamino group). Preferred ammonium derivatives of fatty amido-amines are compounds having the general formula

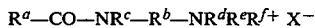

wherein $R^a$ is $C_{11}$-$C_{23}$ alkyl, alkenyl, alkadienyl, or alkatrienyl, $R^b$ is $C_2$-$C_8$ alkylene or alkenylene, $R^c$ is hydrogen or $C_1$-$C_8$ alkyl, $R^d$ and $R^e$ are independently $C_1$-$C_8$ alkyl, $R^f$ is hydrogen or $Ci$-$C_8$ alkyl, and $X^-$ is any suitable counterion (such as halide, sulfate or sulfonate, phosphate or phosphonate, or carboxylate). Suitable ammonium derivatives of this type include those in which $R^a$ is derived from steartc acid, commercial coconut fatty acid mixtures, tallow or train-oil fatty acids, commercial paraffin fatty acids (including mixtures thereof), undecylenic acid, oleic acid, linoleic acid, tall oil fatty acids, ricinoleic acid, and the like. Particularly preferred ammonium derivatives are the protonated ammonium salts of amides prepared from oleic acid or tall oil fatty acids and 3-(dimethylamino)propylamine in which X⁻ is the corresponding fatty acid carboxylate. E.g., U.S. Pat. No. 3,726,952.

Isocyanate-reactive tertiary amine polyethers (c)(i) are particularly preferred for use as component (c). It is also often desirable to use a tertiary amine polyether (c)(i) in combination with a smaller amount fatty amidoamine (c)(ii) and/or an ammonium derivative (c)(iii).

Suitable flame retardants (d) (which, as the term is used herein, also include smoke suppressants and other known combustion modifiers), include phosphonates, phosphites, and phosphates (such as dimethyl methylphosphonate, ammonium polyphosphate, and various cyclic phosphate and phosphonate esters known in the art); halogen-containing compounds known in the art (such as brominated diphenyl ether and other brominated aromatic compounds); melamine; antimony oxides (such as antimony pentoxide and antimony trioxide); zinc compounds (such as various known zinc borates); aluminum compounds (such as alumina trihydrate); and magnesium compounds (such as magnesium hydroxide).

Suitable catalysts (e) include tertiary amines and metal compounds known in the art. Suitable tertiary amine catalysts include triethylamine, tributylamine, N-methylmorphol ine, N-ethylmorphol ine, N,N,N',N'-tetramethylethylene diamine, pentamethyldiethylene triamtne, and higher homologs (German Offenlegungsschriften 2,624,527 and 2,624,528), 1,4-diazabicyclo[2.2.2]octane, N-methyl-N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methyl imidazole, monocycl ic and bicycl ic amidines (German Offenlegungsschrift 1,720,633), bis(dialkylamino)alkyl ethers (U.S. Pat. No. 3,330,782, German Auslegeschrift 030,558, and German Offenlegungsschriften 1,804,361 and 2,618,280), and tertiary amines containing amide groups (preferably formamide groups) according to German Offenlegungsschriften 2,523,633 and 2,732,292. The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines according to German Offenlegungsschrift 2,732,292.

Other suitable catalysts include organic metal compounds, especially organic tin, bismuth, and zinc compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known In the art. Suitable zinc compounds include zinc neodecanoate and zinc versalate. Mixed metal salts containing more than one metal (such as carboxylic acid salts containing both zinc and bismuth) are also suitable catalysts.

Any of the above-mentioned catalysts may, of course, be used as mixtures.

Further representatives of catalysts to be used according to the invention and details concerning their mode of action are described in Kunststoff Handbuch, Volume VII, published by Vieweg and Höchtlen, Carl-Hanser-Verlag, Munich, 1966, for example, on pages 96 to 102.

Suitable additives (f) may optionally also be used in the preparation of the compositions of the invention and include, for example, blowing agents, internal mold release agents, surfactants, acid scavengers, water scavengers, cell regulators, defoaming agents, deaeraters, pigments, dyes, UV stabilizers, plasticizers, fungistatic or bacteriostatic substances, and fillers, such as those described in European Patent Application 81,701 at column 6, line 40, to column 9, line 31. When used, the preferred additives include blowing agents, internal mold release agents, acid scavengers, water scavengers, defoaming agents, and surfactants.

Suitable blowing agents for use in the preparation of polyurethane foams include water and/or readily volatile organic substances. Organic blowing agents include acetone, ethyl acetate, methanol, ethanol, low-boiling hydrocarbons (such as butane, hexane, or heptane) or fluorocarbons, chlorofluorocarbons, hydrochlorofluorocarbons, or other halogen-substituted alkanes (such as methylene chloride, chloroform, ethyl idene chloride, vinyl idene chloride, monofluorotrichloromethane, chlorodifluoromethane, and dichlorodifluoromethane), diethyl ether, or carboxylic acids (such as lactic acid, citric acid, and malonic acid), as well as carbon dioxide generated by the hydrolysis of isocyanate groups. A blowing effect may also be obtained by adding compounds which decompose at temperatures above room temperature and thereby give off gases such as nitrogen (for example, azo compounds such as azoisobutyronitrile or carbon dioxide (such as dimethyl dicarbonate). Other examples of blowing agents and information on their use can be found in *Kunststoff-Handbuch*, Volume VII, Vieweg-Höchtlen, Carl-Hanser-Verlag, Munich, 1966, for example, on pages 108–109, 453–455, and 507–510.

Internal mold release agents are compounds that are added to the reactive components of the isocyanate addition reaction, usually the isocyanate-reactive component, to assist in the removal of a polyurethane product from a mold. Suitable internal mold release agents for the present invention include those based at least in part on fatty acid esters (e.g., U.S. Pat. Nos. 3,726,952, 3,925,527, 4,058,492, 4,098,731, 4,201,847, 4,254,228, 4,868,224, and 4,954,537 and British Patent 1,365,215); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, and 4,895,879); polysiloxanes (e.g., U.S. Pat. No. 4,504,313); amidines (e.g., U.S. Pat. Nos. 4,764,540, 4,789,688, and 4,847,307); resins prepared by the reaction of isocyanate prepolymers and a polyamine-polyimine component (e.g., U.S. Pat. No. 5,198,508); and neutralized esters prepared from certain amine-started tetrahydroxy compounds described In U.S. Pat. No. 5,208,268.

Surfactants (or surface-active agents) include emulsifiers and foam stabilizers. Examples of suitable surfactants include any of several silicone surfactants known in the art (including, for example, those available commercially from Dow Corning Corporation, Union Carbide Chemical and Plastics Co., Inc., and Rhein Chemie Corporation), as well as various amine salts of fatty acids (such as diethylamine oleate or diethanolamine stearate) and sodium salts of ricinoleic acids.

Acid scavengers are compounds that control the acidity and water concentration of the compositions of the invention. Preferred acid scavengers include various orthoesters (such as trimethyl orthoformate), carbodiimides (such as 2,2′,6,6′-tetratsopropyldtphenylcarbodiimides available as STABOXAL I and STABOXAL P from Rhein Chemie Corp.), and epoxides (such as 3,4-epoxycyclohexylmethyl 3,4-epoxycyclohexylcarboxylate, available as ERL-4221 from Union Carbide).

Water scavengers (or moisture scavengers) are compounds that maintain a low water content in the compositions of the invention. Suitable water scavengers are described, for example, in U.S. Pat. Nos. 3,755,222 and 4,695,618. Examples of suitable water scavengers include alkalialuminosilcates (available as BAYLITH L, BAYLITH T, and BAYLITH W powders or pastes from Bayer AG, Germany) and chemically reacting water scavengers (such as ZOLDINE MS-Plus from Angus Chemical Company).

Defoaming agents are compounds known in the art, especially for use with coatings, that inhibit foaming during preparation of the ultimate. isocyanate addition products. Examples of suitable defoaming agents include polysiloxanes (such as dimethyl polysiloxane, polysiloxane polyether copolymers, and modified polymethylsiloxanes) and emulsifiable petroleum oils known in the art.

Known fillers and/or reinforcing substances, such as barium sulfate, calcium carbonate, calcium silicate, clays, kieselguhr, whiting, mica, and especially glass fibers, liquid crystal fibers, glass flakes, glass balls, microspheres, aramide fibers, and carbon fibers, are also suitable.

The storage-stable isocyanate-reactive compositions of the present invention can be prepared by mixing the individual components in any order but are preferably prepared by first mixing components (a), (b), and (c), followed by adding in sequence components (d), (f), and (e).

The isocyanate-reactive compositions of the present invention contain certain tertiary amine or ammonium compounds (preferably isocyanate-reactive tertiary amine polyethers) that confer storage stability on the compositions, even when flame retardants are present. Such isocyanate-reactive compositions can be used for the preparation of various urethane-based products by methods known in the art, such as reaction injection molding ("RIM"), resin transfer molding ("RTM"), cast molding, open pour molding, and spraying. Polyurethane systems based on the compositions of the present invention can be formulated for the preparation of microcellular or non-microcellular rigid polyurethanes, microcellular or non-microcellular elastomeric polyurethanes, including integral skin or non-skinning polyurethanes. As used herein, the term "polyurethane" also refers to polyureas and polyurethane polyurea hybrids.

When preparing polyurethanes according to the invention by the isocyanate addition reaction, the storage-stable isocyanate-reactive compositions of this invention are allowed to react with organic polyisocyanates known in the art. Suitable polyisocyanates can be unmodified isocyanates, modified polyisocyanates, or isocyanate prepolymers. Suitable organic polyisocyanates include aliphatic, cycloaliphatic, araliphatic, aromatic, and heterocyclic polyisocyanates of the type described, for example, by W. Siefken in *Justus Liebigs Annalen der Chemie,* 562, pages 75 to 136. Such isocyanates include those having the formula

$Q(NCO)_n$ in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable tsocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4′-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4′and/or-4,4′-diisocyanate ("MDI"); naphthylene-1,5-diisocyanate; triphenylmethane-4,4′,4″-triisocyanate; polyphenyl-polymethylene-polyisocyanaates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956,in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and mixtures of these isomers ("TDI"); polyphenyl-polymethylenepolyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

It is, of course, also possible to use isocyanate prepolymers prepared by reaction of any of the above polyisocyanates with a substoichiometric amount of an isocyanate-reactive compound such as, for example, those described above for component (a).

Regardless of the particular type of polyurethane product that is to be prepared, the polyurethane-forming reaction components (that is, the isocyanate-reactive component and the isocyanate component) may be allowed to react, for example, by one-stage reactions, prepolymer reactions, or semiprepolymer reactions. Suitable techniques include reaction injection molding ("RIM"), resin transfer molding ("RTM"), cast molding, open pour molding, and spraying. Machines, such as those described in U.S. Pat. No. 2,764,565, may be used in many of these processes. Particulars of the processing machines which may also be used to produce polyurethanes according to the invention may be found in Kunststoff-Handbuch, Vol. VII, Vieweg and Höchtlen, Carl-Hanser-Verlag, Munich 1966, pages 121 to 205.

When carrying out a reaction of an isocyanate-reactive composition according to the invention with an isocyanate, the quantity of isocyanate component should preferably be such that the isocyanate index is from 80 to 130. By "isocyanate index" is meant the quotient of the number of isocyanate groups divided by the number of isocyanate-reactive groups, multiplied by 100. For example, when preparing a rigid polyurethane foam, the isocyanate index is preferably from 100 to 120. On the other hand, when preparing a polyurethane elastomer, the isocyanate index is preferably from 90 to 110. When using an isocyanate-reactive composition according to the invention for spraying, the isocyanate index is preferably from 90 to 120.

Molded foams prepared using the compositions of the present invention may be prepared by introducing the reaction mixture into a suitable mold. Suitable mold materials include metals (for example, aluminum or steel) or plastics (for example, unsaturated polyester resin or epoxide resin). In the mold, the foamable reaction mixture foams to form the molded product. In-mold foaming may be carried out in such a way that the molding has a compact skin and a cellular core. It is possible to introduce into the mold a quantity of foamable reaction mixture such that the foam formed just fills the mold. It is also possible to introduce into the mold more foamable reaction mixture than is required to fill the interior of the mold with foam, technique known as "over-charging" and described, for example, in U.S. Pat. Nos. 3,178,490 and 3,182,104.

Spray systems are, of course, applied to suitable substrates using known spray apparatus, such as those described in U.S. Pat. No. 2,764,565. Details concerning processing apparatus that may be used according to the invention may be found in Kunststoff-Handbuch, Vol. VII, Vieweg and Höchtlen, Carl-Hanser-Verlag, Munich 1966. High pressure equipment having the ability to heat the components is generally used for the application of spray systems. The pressure required is generally about 7 to 11 Mpa, with throughput of about 3 to 10 kg per minute. The organic polyisocyanate and isocyanate-reactive compositions according to the invention are mixed and sprayed using a spray gun equipped for static, impingement, or dynamic mixing. Suitable two-component spray pumps and guns are manufactured by, for example, Binks Manufacturing Company, Gusmer (PMC, Inc.), Graco Inc., Glass Craft Inc., TAH Industries, and Unipre GmbH.

Although any of the isocyanate-reactive compositions of the invention exhibit improved storage stability, the relative amounts of the various reactive components and additives can dramatically affect the physical properties obtained. Thus, each type of desired product and method of application typically employs a more narrowly defined range of quantities for each of the components.

For example, in the preparation of rigid microcellular or non-microcellular urethane-based products, preferred isocyanate-reactive compositions of the invention contain 18 to 57 percent by weight (more preferably 21 to 48 percent by weight) of isocyanate-reactive component (a); 28 to 67 percent by weight (more preferably 35 to 62 percent by weight) of chain extender or crosslinker (b); 1.4 to 27 percent by weight (more preferably 2 to 23 percent by weight) of component (c); 10 to 38 percent by weight (more preferably 10 to 24 percent by weight) of flame retardant (d); and 0.07 to 3.5 percent by weight (more preferably 0.2 to 2 percent by weight) of catalyst (e), all amounts being based on the total amount of components (a), (b), (c), (d), and (e). When the preferred isocyanate-reactive component (a) includes a polyamine or aminocrotonate-terminated polyether, component (c) is preferably 3 to 24 percent by weight (more preferably 3 to 19 percent by weight and most preferably 3 to 14 percent by weight) of an isocyanate-reactive tertiary amine polyether (c)(i) and may optionally also contain as a second component 0.7 to 14 percent by weight (more preferably 1 to 11 percent by weight and most preferably 2 to 9 percent by weight) of a fatty amido-amine (c)(ii). When the preferred isocyanate-reactive component (a) does not include a polyamine or aminocrotonate-terminated polyether, component (c) is also preferably an isocyanate-reactive tertiary amine polyether (c)(i) (in the quantities listed immediately above) but the preferred optional second component is an ammonium salt derivative of a fatty amido-amine (c)(iii) (preferably 3 to 24 percent by weight, more preferably 3 to 19 percent by weight, and most preferably 3 to 14 percent by weight). Although chain extenders and crosslinkers containing amino and thiol groups can be used, chain extenders and crosslinkers containing hydroxyl groups are preferred. Preferred flame retardants are liquid for processing ease and include, for example, dimethyl methylphosphonate or ANTIBLAZE NR-25, but solid flame retardants can also be effective. Limitations on the physical state of the flame retardant are, in general, determined by equipment processing capabilities. Preferred catalysts include tin (especially tin (IV)) compounds and N,N-dimethylcyclohexylamine. Additives, if used at all, preferably include 0 to 3 percent by weight of a blowing agent, 0 to 2.5 percent by weight of an acid scavenger, 0 to 10 percent by weight of an internal mold release agent, 0 to 3 percent by weight of a surfactant, 0 to 1 percent by weight of a defoaming agent, and 0 to 5 percent by weight of a water scavenger.

In the preparation of microcellular and non-microcellular urethane-based elastomers, preferred lsocyanate-reactive compositions of the invention contain 32 to 90 percent by weight (more preferably 50 to 76 percent by weight) of isocyanate-reactive component (a); 0.7 to 38 percent by weight (more preferably 3 to 24 percent by weight) of chain extender or crosslinker (b); 1.4 to 27 percent by weight (more preferably 2 to 23 percent by weight) of component (c); 20 to 48 percent by weight (more preferably 25 to 48 percent by weight) of flame retardant (d); and 0.07 to 3.5 percent by weight (more preferably 0.2 to 2 percent by weight) of catalyst (e), all amounts being based on the total amount of components (a), (b), (c), (d), and (e). When the preferred isocyanate-reactive component (a) includes a polyamine or aminocrotonate-terminated polyether, component (c) is preferably 3 to 24 percent by weight (more preferably 3 to 19 percent by weight and most preferably 3 to 14 percent by weight) of an isocyanate-reactive tertiary amine polyether (c)(i) and may optionally also contain as a second component 0.7 to 14 percent by weight (more preferably 1 to 11 percent by weight and most preferably 2 to 9 percent by weight) of a fatty amido-amine (c)(ii). When the preferred isocyanate-reactive component (a) does not include a polyamine or aminocrotonate-terminated polyether, component (c) is also preferably an isocyanate-reactive tertiary amine polyether (c)(i) (in the quantities listed immediately above) but the preferred optional second component is an ammonium salt derivative of a fatty amido-amine (c)(iii) (preferably 3 to 24 percent by weight, more preferably 3 to 19 percent by weight, and most preferably 3 to 14 percent by weight). Although chain extenders and crosslinkers containing thiol groups can be used, chain extenders and crosslinkers containing hydroxyl or amino groups are preferred. Preferred flame retardants include ammonium polyphosphate, alumina trihydrate, melamine, ANTIBLAZE NR-25, and halogen-containing compounds. Preferred catalysts include tin compounds and tertiary amines. Additives, if used at all, preferably include 0 to 3 percent by weight of a blowing agent, 0 to 2.5 percent by weight of an acid scavenger, 0 to 10 percent by weight of an internal mold release agent, 0 to 3 percent by weight of a surfactant, 0 to 1 percent by weight of a defoaming agent, and 0 to 5 percent by weight of a water scavenger.

For urethane-based spray applications, preferred isocyanate-reactive compositions of the invention contain 10 to 75 percent by weight (more preferably 15 to 65 percent by weight) of isocyanate-reactive component (a); 1 to 50 percent by weight (more preferably 1.5 to 35 percent by weight) of chain extender or crosslinker (b); 5 to 15 percent by weight (more preferably 6 to 10 percent by weight) of component (c) ; 5 to 55 percent by weight {more preferably 20 to 48 percent by weight) of flame retardant (d); and 0.01 to 1.5 percent by weight (more preferably 0.1 to 1.0 percent by weight) of catalyst (e), all amounts being based on the total amount of components (a), (b), (c), (d), and (e). Catalyst (e) is typically added after all of the other components have been blended. Although chain extenders and crosslinkers containing thiol groups can be used, chain extenders and crosslinkers containing amino or hydroxyl groups are preferred. Component (c) is preferably 6 to 10 percent by weight of an isocyanate-reactive tertiary amine polyether (c)(i). Preferred flame retardants include phosphorus-, zinc-, aluminum-, and magnesium-based compounds and halogen-containing compounds. Preferred catalysts include tin(IV)-, bismuth-, and zinc-based compounds. Additives, if used at all, preferably include 0 to 2.5 percent by weight of an acid scavenger (preferably carbodiimides), 0 to 6 percent by weight of an internal mold release agent (preferably ester-based mold release agents), 0.01 to 1.0 percent by weight of a defoaming agent (preferably polyosiloxanes), and 1.0 to 10 percent by weight of a water scavenger (preferably aluminosil icates).

The following examples further illustrate details for the preparation and use of the tompositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and. percentages by weight, respectively.

EXAMPLES

The following starting materials were used to prepare the isocyanate-reactive compositions of the Examples:

Polyols and Polyamines (a1) Polyether prepared by sequential reaction of glycerol and propylene glycol (90:10 by weight) with propylene oxide (30%), a mixture of ethylene glycol (10%) and propylene glycol (40%), and capped with propylene glycol (20%) having a hydroxyl number of 56

(a2) Glycerol-started polyether of propylene oxide and ethylene oxide (83 wt. % propylene oxide and 17 wt. % ethylene oxide) having a hydroxyl number of 28

(a3) Polyester of neopentyl glycol and adipic acid having a hydroxyl number of 112 (available as FORMREZ 55-112 from Witco Corporation)

(a4) Polyester of neopentyl glycol and adipic acid having a hydroxyl number of 225 (available as FORMREZ 55-225 from Witco Corporation)

(a5) Aliphatically bound amine-terminated polyoxypropylene having a functionality of 2 and a molecular weight about 2000 (available as JEFFAMINE D-2000 from Texaco Chemical Company)

(a6) Aliphatically bound amine-terminated polyoxypropylene having a functionality of 3 and a molecular weight about 5000 (available as TEXRIM TR-5050 from Texaco Chemical Company)

(a7) Aminocrotonate-terminated polyether having a functionality of 4 and a molecular weight of about 4700 prepared from as described in U.S. Pat. Nos. 5,066,824 and 5,151,470 from (i) a difunctional polyether having a hydroxyl number of 56 prepared by the reaction of propylene glycol with propylene oxide and (ii) 2-methyl-1,5-diaminopentane (a8) Glycerol-started polyether of propylene oxide and ethylene oxide (87 wt. % propylene oxide and 13 wt. % ethylene oxide) having a primary OH content of about 82% and a hydroxyl number of 28

(a9) Trimethylolpropane-started polyether of propylene oxide having a hydroxyl number of 370

(a10) Glycerol-started polyether of propylene oxide having a hydroxyl number of 250

(a11) Polyether prepared by the reaction of sucrose, propylene glycol, and water (44:52:4 by weight) with propylene oxide having a hydroxyl number of 380

Chain Extenders and Crosslinkers (b1) Glycerol-started polyether of propylene oxide having a functionality of 3 and a hydroxyl number of 1050 (molecular weight about 160)

(b2) Mixture of 1-methyl-3,5-diethyl-2,4-diaminobenzene and 1-methyl-3,5-diethyl-2,6-diaminobenzene (65:35 weight ratio)

(b3) Glycerol-started polyether of propylene oxide having a hydroxyl number of 470

(b4) meta-Xylene diamine

Tertiary Amine and Ammonium Compounds (c1) Ethylenediamine-started polyether of propylene oxide having a functionality of 4 and a hydroxyl number of 630

(c2) Cocamidopropyldimethylamine (available as ADOGEN K-14 from Witco Corporation)

(c3) Protonated ammonium salt of tall oil fatty acids and the amide of tall oil fatty acids and 3-(dimethylamino)propylamine (see U.S. Pat. No. 3,726,952)

Flame Retardants (d1) Diethyl N,N-bis(2-hydroxyethyl)aminomethylphosphonate (available as FYROL 6 from Akzo Chemicals Inc.)

(d2) Dimethyl methylphosphonate (available as FYROL DMMP from Akzo Chemicals Inc.)

(d3) Neutral cyclic phosphonate ester containing 21% phosphorus (available as ANTIBLAZE NR-25 from Albright and Wilson Americas, Inc.)

(d4) Oligomeric phosphate ester available as FYROL 51 from Akzo Chemicals Inc.

(d5) Halogenated phosphate ester containing 6–8% phosphorus and 35–37% bromine available as FIREMASTER 836 from Great Lakes Chemical Corporation (d6) Alumina trihydrate Catalysts (e1) N,N-dimethylcyclohexylamine (available as POLYCAT 8 from Air Products & Chemicals, Inc.)

(e2) Glycol acid salt of tetraethylenediamine and 1,1-dibutyltin diacetate (available as DABCO DC-2 from Air Products & Chemicals, Inc.)

(e3) Dibutyltin bis(isooctylmaleate) available as DABCO 125 from Air Products & Chemicals, Inc.

(e4) Organotin carboxylate catalyst available as FOMREZ UL-28 from Witco Corporation (e5) Dimethyl tin mercaptide (available as FOMREZ UL-22 from Witco Corporation)

(e6) Dibutyltin bis(dodecylmercaptide) (available as DABCO 120 from Air Products & Chemicals, Inc.)

(e7) Bismuth neodecanoate available from Cosan Chemical Corporation

Additives (f1) Silicone surfactant available as Dow Corning 193 from Dow Corning Corporation (f2) Polyalkylene oxide/methylsiloxane copolymer surfactant available as Y10809 from Union Carbide Chemicals and Plastics Co., Inc.

(f3) Ethoxylated fatty amines (mildly cationic surfactant available as TRYMEEN 6606 from Henkel Corporation)

(f4) Ethoxylated fatty amines (mildly cationic surfactant available as TRYMEEN 6617 from Henkel Corporation)

(f5) Silicone internal mold release available as Dow Corning 1248 fluid from Dow Corning Corporation (f6) N,N,N'-(2-hydroxyethyl)-N'-tallow-1,3-propanediamine internal mold release having a hydroxyl number of 317 (available as ETHODUOMEEN T/13 from Akzo Chemicals Inc.)

(f7) Amidine salt internal mold release prepared by the reaction of 12 parts by weight of 2-(1-heptadecyl)-3-(2-hydroxyethyl)-2-imidazoline and 88 parts by weight of a carboxy-functional silicone available as Q2-7119 from Dow Corning Corporation) (e.g., U.S. Pat. No. 4,764,540)

(f8) 2-Hydroxypropanoic acid (blowing agent available from Sterling Chemicals Inc.)

(f9) 2,2',6,6'-Tetraisopropyldiphenylcarbodiimide (acid scavenger available as STABOXAL I from Rhein Chemie Corp.)

(f10) 3,4-Epoxycyclohexylmethyl 3,4-epoxycyclohexylcarboxylate (acid scavenger available as ERL-4221 from Union Carbide)

(f11) Trimethyl orthoformate (acid scavenger)

(f12) Alkali aluminosilicate in castor oil (water scavenger available from A. B. Colby or Bayer AG, Germany)

(f13) Alkali aluminosilicate (water scavenger available as BAYLITH L from Bayer AG, Germany)

(f14) Defoamer concentrate containing dimethyl polysiloxane dispersed in silicic acid available as Tego FOAMEX N from Tego Chemie Service USA The following organic isocyanates were used to prepare polyurethanes from the isocyanate-reactive compositions of the Examples:

(I) Mixture of equal parts by weight of (i) a liquid semi-prepolymer (NCO content about 23%) prepared by the reaction of 4,4'-diphenylmethane diisocyanate and tripropylene glycol in a molar ratio of about 5:1 and (ii) an aniline-formaldehyde condensation product (NCO content about 2%; average functionality about 2.8) containing about 44% monomeric 4,4'-diphenylmethane diisocyanate (the balance being essentially higher functional ity homologs)

(II) Polyisocyanate containing about 60% monomeric diphenylmethane diisocyanate and 40% polyphenyl-polymethylenepolyisocyanate and having an NCO content about 33% and a viscosity (25° C.) of 50–100 cps (III) Isocyanate prepolymer having an NCO content of 27% (prepared from an organic polyisocyanate and a substoichiometric amount of a polyether polyol) available as BAYTEC RE527A from Miles Inc.

The following flame retardants were blended with the isocyanate components for use in spray systems:

(d7) Aromatic brominated flame retardant available as SAYTEX 8010 from Ethyl Corporation (d8) Pentabromodiphenyl oxide (available as DE-71 from Great Lakes Chemical Corporation)

Examples 1-25

Microcellular Rigid Integral Skin Foam Systems

Isocyanate-reactive blends were prepared in approximately four-liter quantities by adding the components in decreasing volume order (with catalysts normally being added last). For purposes of carrying out comparison experiments, each set of examples was carried out by initially preparing a master batch containing all ingredients having constant amounts and then adding only the variable components to form the blends.

After the isocyanate-reactive blends were prepared and allowed to stand for specified periods of time, the blends were mixed with organic polyisocyanates at an isocyanate index of 110 (i.e., 10% excess NCO), indicated in the following Tables as parts by weight of polyisocyanate per 100 parts by weight of the NCO-reactive blends. Stabilities of the various blends were determined by observing the gel times for the isocyanate addition reactions.

The isocyanate-reactive blends and the organic polyisocyanates were separately brought to a temperature of 25° C. before being mixed. The reaction mixtures were mixed in a high speed mixer for about 6-8 seconds and poured into a cup. A timer was started when mixing was begun. Gel times were determined by observing the time at which the first thin string of polyurethane could be pulled by plunging an applicator stick in and out of the mixture. Gel time determinations were reproducible within about 1.5 seconds.

The reaction procedure and gel time determinations were carried out immediately upon preparing the isocyanate-reactive blends (i.e., no storage) and after storage at room temperature for one day, four days, one week, two weeks, three weeks, four weeks, two months, three months, and six months. In general, tests were carried out until relatively large changes were evident or until no further deterioration could be observed. Smaller changes in reaction time indicate improved stability of the NCO-reactive blends.

Where indicated, the following Examples apply an experimental design method known as the "Taguchi Experimental Design Approach" for product optimization by analysis of variance. See Y. Wu and W. H. Moore, *Quality Engineerinq Product and Process Design Optimization* (American Design Institute, Inc. 1985). The Taguchi method allows the simultaneous examination of several variables having differing relative amounts and types. Where used in the following Examples, the experiments are listed orthogonally in the Tables so that the effects obtained by varying a given parameter can be visually separated from other varying effects.

Examples 1-8

Each of Examples 1-8 includes a base blend 1 containing the following components (parts by weight):

| Component | Amount |
|---|---|
| Polyether (a1) | 20 parts |
| Polyester (a4) | 20 parts |
| Crosslinker (b1) | 50 parts |
| Flame retardant (d1) | 20 parts |
| Surfactant (f1) | 3 parts |
| Mold release (f5) | 1 part |
| Mold release (f6) | 5 parts |
| Mold release (f7) | 3.5 parts |
| Blowing agent (f8) | 1.5 parts |

Quantities of the remaining components and test results for Examples 1-8 are shown in Table 1.

TABLE 1

Compositions and results for Examples 1-8.

| Components (parts by weight) | Examples | | | | | | | |
|---|---|---|---|---|---|---|---|---|
| | 1 | 2 | 3 | 4 | 5 | 6 | 7 | 8 |
| NCO-reactive blend[1] | | | | | | | | |
| Ammonium salt (c3) | — | — | 6 | 6 | — | — | 6 | 6 |
| Flame retardant (d2) | 20 | 20 | 20 | 20 | — | — | — | — |
| Flame retardant (d4) | — | — | — | — | 20 | 20 | 20 | 20 |
| Catalyst (e1) | 3.5 | 2.5 | 2.5 | 3.5 | 3.5 | 2.5 | 2.5 | 3.5 |
| Catalyst (e5) | 0.4 | 0.2 | 0.4 | 0.2 | 0.4 | 0.2 | 0.4 | 0.2 |
| Acid scavenger (f9) | 2 | — | — | 2 | — | 2 | 2 | — |
| Water scavenger (f12) | 2 | — | 2 | — | — | 2 | — | 2 |
| Water | — | — | 0.2 | 0.2 | 0.2 | 0.2 | — | — |
| Isocyanate component | | | | | | | | |
| Polyisocyanate (I)[2] | 141 | 146 | 141 | 141 | 147 | 149 | 144 | 143 |
| Isocyanate index | 110 | 110 | 110 | 110 | 110 | 110 | 110 | 110 |
| Change in gel time (sec)[3] | | | | | | | | |
| Three weeks | 10 | 10 | 5 | 6 | 26 | 24 | 15 | 26 |
| Two months | 13 | 16 | 7 | 8 | — | — | — | — |

[1]Isocyanate-reactive blends also include base blend 1 (described above).
[2]Parts by weight of polyisocyanate (I) per 100 parts by weight of the NCO-reactive blend.
[3]Change in gel time relative to reaction after no storage of NCO-reactive blend.

Examples 1-8 were performed in accordance with the Taguchi method. The variable and corresponding levels (listed in increasing numeric order where appropriate) were as follows: ammonium salt (c3) at 0 and 6 parts by weight; flame retardants (d2) and (d4); catalyst (e1) at 2.5 and 3.5 parts by weight; catalyst (e5) at 0.2 and 0.4 parts by weight; acid scavenger (f9) at 0 and 2 parts by weight; water scavenger (f12) at 0 and 2 parts by weight; and water at 0 and 0.2 parts by weight. Variance table analysis for the compositions shown in Table 1 (above) after four weeks storage are as follows:

| Variable | Level #1 | Level #2 | Level sums* #1 | Level sums* #2 | Percent contribution** |
|---|---|---|---|---|---|
| (c3) | 0 | 6 | 174 | 128 | 11.3 |
| (d2)/(d4) | (d2) | (d4) | 92 | 210 | 74.6 |
| (e1) | 2.5 | 3.5 | 139 | 163 | 3.0 |
| (e5) | 0.2 | 0.4 | 163 | 139 | 3.0 |
| (fg) | 0 | 2 | 169 | 133 | 6.9 |
| (f12) | 0 | 2 | 151 | 151 | — |
| Water | 0 | 0.2 | 154 | 148 | 0.1 |
| Error | | | | | 1.1 |

*Level sums are derived in the Taguchi analysis for each variable at levels #1 and #2. The smaller of the level sum numbers for each variable indicates the more positive effect on shelf life.
**Percent contribution (rho) compares the percent contribution of each source of variation to the total.

The Taguchi analysis shows that although the type of flame retardant has the greatest effect on shelf-life stability in these Examples, the addition of polyether amine (c3) significantly improves shelf life regardless of which flame retardant is used. In addition, the stabilizing effect of polyether amine (c3) is greater than the effect obtained by adding acid scavengers or water scavengers, which are known to help improve shelf-life stability, for example, when using acidic flame retardants. The analysis shows that catalyst type and amount are also significant but are less significant than the effect of using polyether amine (c3).

Examples 9-17

Each of Examples 9-17 includes a base blend 3 containing the following components (parts by weight):

| | |
|---|---|
| Polyether (a2) | 40 parts |
| Crosslinker (b1) | 53 parts |
| Flame retardant (d2) | 23 parts |
| Catalyst (e1) | 2.5 parts |
| Surfactant (f1) | 3 parts |
| Mold release (f5) | 1 part |
| Mold release (f6) | 5 parts |
| Mold release (f7) | 3.5 parts |
| Blowing agent (f8) | 1.5 parts |

Quantities of the remaining components and test results for Examples 9-17 are shown in Table 2.

TABLE 2

Compositions and results for Examples 9-17.

| Components (parts by weight) | Examples | | | | | | | | |
|---|---|---|---|---|---|---|---|---|---|
| | 9 | 10 | 11 | 12 | 13 | 14 | 15 | 16 | 17 |
| NCO-reactive blend[1] | | | | | | | | | |
| Chain extender (b2) | 3 | 3 | 3 | — | — | — | — | — | — |
| Amine polyether (c1) | — | — | — | — | — | — | 10 | 10 | 10 |
| Ammonium salt (c3) | 3 | 6 | 9 | 3 | 6 | 9 | 3 | 6 | 9 |
| Catalyst (e3) | — | 0.8 | — | — | — | 0.8 | 0.8 | — | — |
| Catalyst (e4) | 0.2 | — | — | — | 0.2 | — | — | — | 0.2 |
| Catalyst (e5) | — | — | 0.2 | 0.2 | — | — | — | 0.2 | — |
| Acid scavenger (f9) | — | 2 | — | 2 | — | — | — | — | 2 |
| Acid scavenger (f10) | 0.002 | — | — | — | — | 0.002 | — | 0.002 | — |
| Isocyanate component | | | | | | | | | |
| Polyisocyanate (I)[2] | 131 | 131 | 133 | 137 | 133 | 129 | 136 | 137 | 132 |
| Isocyanate index | 110 | 110 | 110 | 110 | 110 | 110 | 110 | 110 | 110 |
| Change in gel time (sec)[3] | | | | | | | | | |
| Two weeks | 8 | 2 | 7 | 7 | 5 | 11 | 2 | 3 | 2 |
| Six months | 7 | — | 19 | 21 | — | 11 | 3 | 6 | 0 |

[1]Isocyanate-reactive blends also include base blend 2 (described above).
[2]Parts by weight of polyisocyanate (I) per 100 parts by weight of the NCO-reactive blend.
[3]Change in gel time relative to reaction after no storage of NCO-reactive blend.

Examples 9-17 were also performed in accordance with the Taguchi method. The variable and corresponding levels (listed in increasing numeric order where appropriate) were as follows: amine type using none, extender (b2), and amine polyether (c1); ammonium salt (c3) at 3, 6, and 9 parts by weight; catalyst type using catalysts (e5), (e4), and (e3); and acid scavenger type using acid scavengers (f9) and (f10) and none. (Catalyst amounts were adjusted so that the reactivity profile was identical on day zero for all Examples. Acid scavenger levels were selected for known optimum effect.) Variance table analysis for the compositions shown in Table 2 (above) after two weeks storage are as follows:

| | Level | | | Level sums* | | | Percent contribution** |
|---|---|---|---|---|---|---|---|
| Variable | #1 | #2 | #3 | #1 | #2 | #3 | |
| Amine type | 0 | (b2) | (c1) | 47 | 33 | 11 | 56.7 |
| (c3) | 3 | 6 | 9 | 33 | 22 | 36 | 9.2 |
| Catalyst type | (e5) | (e4) | (e3) | 35 | 26 | 30 | 3.3 |
| Acid scavenger type | (f9) | (f10) | None | 18 | 44 | 29 | 29.2 |
| Error | | | | | | | 1.5 |

*Level sums are derived in the Taguchi analysis for each variable at levels #1, #2, and #3. The smaller of the level sum numbers for each variable indicates the more positive effect on shelf life.
**Percent contribution (rho) compares the percent contribution of each source of variation to the total.

The Taguchi analysis shows that base polyether levels and amine type (including amine polyether (c1)) have the greatest effect on shelf-life stability in these Examples. However, the addition of ammonium salt (c3) also significantly improves shelf life. The analysis also shows that catalyst type and acid scavenger type have relatively little effect on shelf-life stability.

Examples 18-19

Examples 18 and 19 used essentially the same components as Examples 15-17 except for the addition of flame retardant (d3). Quantities of components and test results for Examples 10 and 11 are shown in Table 3.

Example 18 shows that the use of amine polyether (c1) along with an optimal amount of ammonium salt (c3) provides no change in shelf-life stability after three weeks or even three months, regardless of the type of catalyst used or whether an acid scavenger is present. Example 19 shows that this same effect is obtained when using an alternative flame retardant (d2) in combination with flame retardant (d3) (at comparative combustion modifying performance levels).

TABLE 3

Compositions and results for Examples 18 and 19.

| Components (parts by weight) | Examples | |
|---|---|---|
| | 18 | 19 |
| NCO-reactive blend | | |
| Polyether (a2) | 32 | 32 |
| Crosslinker (b1) | 58 | 58 |
| Amine polyether (c1) | 10 | 10 |
| Ammonium salt (c3) | 6 | 6 |
| Flame retardant (d2) | — | 10.5 |
| Flame retardant (d3) | 21 | 10.5 |
| Catalyst (e1) | 2 | 2 |
| Catalyst (e3) | 0.4 | 0.4 |
| Surfactant (f1) | 3 | 3 |
| Mold release (f5) | 1 | 1 |

TABLE 3-continued

Compositions and results for Examples 18 and 19.

| Components (parts by weight) | Examples 18 | Examples 19 |
|---|---|---|
| Mold release (f6) | 5 | 5 |
| Mold release (f7) | 3.5 | 3.5 |
| Blowing agent (f8) | 1.3 | 1.3 |
| Isocyanate component | | |
| Polyisocyanate (I)[1] | 152 | 151 |
| Isocyanate index | 110 | 110 |
| Change in gel time (sec)[2] | | |
| Three weeks | 3 | 3 |
| Three months | 4 | 2 |

[1]Parts by weight of polyisocyanate (I) per 100 parts by weight of the NCO-reactive blend.
[2]Change in gel time relative to reaction after no storage of NCO-reactive blend.

Examples 20-21

Examples 20 and 21 were carried out using the same components and quantities except that Example 20 contained no flame retardant component and Example 21 contained flame retardants (d2) and (d3). Quantities of components and test results for Examples 20 and 21 are shown in Table 4.

Examples 20 and 21 show that amine components (c1) and (c3) provide isocyanate-reactive blends having storage stability as good as compositions having no phosphorus-containing flame retardant.

TABLE 4

Compositions and results for Examples 20-21.

| Components (parts by weight) | Examples 20 | Examples 21 |
|---|---|---|
| NCO-reactive blend | | |
| Polyether (a2) | 32 | 32 |
| Crosslinker (b1) | 58 | 58 |
| Amine polyether (c1) | 10 | 10 |
| Ammonium salt (c3) | 6 | 6 |
| Flame retardant (d2) | — | 11 |
| Flame retardant (d3) | — | 11 |
| Catalyst (e2) | 0.8 | 0.8 |
| Catalyst (e3) | 0.4 | 0.4 |
| Surfactant (f2) | 3 | 3 |
| Mold release (f6) | 5 | 5 |
| Mold release (f7) | 3.5 | 3.5 |
| Blowing agent (f8) | 1.3 | 1.3 |
| Isocyanate component | | |
| Polyisocyanate (I)[1] | 187 | 155 |
| Isocyanate index | 110 | 110 |
| Change in gel time (sec)[2] Three weeks | 0 | 0 |

[1]Parts by weight of polyisocyanate (I) per 100 parts by weight of the NCO-reactive blend.
[2]Change in gel time relative to reaction after no storage of NCO-reactive blend.

Examples 22-25

Examples 23 and 25 compare the effect of using amine polyether (c1) in combination with different flame retardants. Examples 22 and 24 are the respective comparison examples containing no amine polyether (c1). Quantities of components and test results for Examples 22-25 are shown in Table 5.

Amine polyether (c1) provides improved stabilization of foam systems containing alternative flame retardants, even when ammonium salt (c3) is also present.

TABLE 5

Compositions and results for Examples 22-25.

| Components (parts by weight) | 22 | 23 | 24 | 25 |
|---|---|---|---|---|
| NCO-reactive blend | | | | |
| Polyether (a2) | 40 | 40 | 40 | 40 |
| Crosslinker (b1) | 53 | 53 | 53 | 53 |
| Amine polyether (c1) | — | 10 | — | 10 |
| Ammonium salt (c3) | 6 | 6 | 6 | 6 |
| Flame retardant (d4) | 20 | 20 | — | — |
| Flame retardant (d5) | — | — | 20 | 20 |
| Catalyst (e1) | 2 | 2 | 2 | 2 |
| Catalyst (e3) | 0.4 | 0.4 | 0.4 | 0.4 |
| Surfactant (f1) | 3 | 3 | 3 | 3 |
| Mold release (f5) | 1 | 1 | 1 | 1 |
| Mold release (f6) | 5 | 5 | 5 | 5 |
| Mold release (f7) | 3.5 | 3.5 | 3.5 | 3.5 |
| Blowing agent (f8) | 1.3 | 1.3 | 1.3 | 1.3 |
| Isocyanate component | | | | |
| Polyisocyanate (I)[1] | 140 | 139 | 135 | 139 |
| Isocyanate index | 110 | 110 | 110 | 110 |
| Change in gel time sec [2] Three weeks | 21 | 11 | 9 | 3 |

[1]Parts by weight of polyisocyanate (I) per 100 parts by weight of the NCO-reactive blend.
[2]Change in gel time relative to reaction after no storage of NCO-reactive blend.

Examples 26-43

Rigid Non-Microcellular Foam Systems

Isocyanate-reactive blends used for the preparation of rigid non-microcellular applications were prepared as described for Examples 1-25. Because the isocyanate addition reaction is relatively rapid for most of these examples, the reaction was retarded by adding 25 parts by weight of MESAMOLL alkylsulfonic acid ester of phenol to the isocyanate-reactive blend, with appropriate adjustments in quantities being made to obtain the desired isocyanate index. Comparisons of the reactivities for each isocyanate-reactive blend showed that the addition of MESAMOLL did not significantly affect the aging process.

Examples 26-31

Examples 26-31 illustrate the stabilizing effect of amine polyether (c1) in rigid non-microcellular systems containing flame retardants. Example 26 is a comparison example containing no phosphorus flame retardant. Quantities of components and test results for Examples 26-31 are shown in Table 6.

Examples 27 and 28 show comparable changes in reactivity when using either of the flame retardants (d2) or (d3) in the absence of amine polyether (c1). Examples 29 and 30 show that reactivity of the blends is lost over a two-month period when using catalyst (e1), either alone or as a mixture with catalyst (e6), in the absence of amine polyether (c1).

Examples 26-30 did not require the use of the MESAMOLL alkylsulfonic ester because the reactivities of the respective isocyanate-reactive blends decreased so rapidly that the isocyanate addition reaction were easily compared without being retarded. Example 31 (as well as subsequent Examples 32-43) were carried out in the presence of the MESAMOLL alkylsulfonic ester. The data show that even with the addition of MESAMOLL alkylsulfonic ester in Example 31 to slow the reaction, the change in reactivity was not dramatically affected even after six months, a result that compares favorably to those systems not containing any flame retardant (such as Example 26).

TABLE 6

Compositions and results for Examples 26-31.

| Components (parts by weight) | \multicolumn{6}{c}{Examples} | | | | | |
|---|---|---|---|---|---|---|
| | 26 | 27 | 28 | 29 | 30 | 31 |
| NCO-reactive blend | | | | | | |
| Polyester (a3) | — | — | — | 15 | 15 | — |
| Polyester (a4) | 15 | 15 | 15 | — | — | 15 |
| Polyether (a5) | — | — | — | 35 | 35 | — |
| Polyether (a6) | 25 | 25 | 25 | — | — | 25 |
| Crosslinker (b1) | 60 | 60 | 60 | 50 | 50 | 60 |
| Amine polyether (c1) | — | — | — | — | — | 10 |
| Flame retardant (d2) | — | 20 | — | — | — | 20 |
| Flame retardant (d3) | — | — | 21 | 21 | 21 | — |
| Catalyst (e1) | 5 | 5 | 5 | 5 | 1 | 1.5 |
| Catalyst (e6) | — | — | — | — | 0.65 | 0.4 |
| Surfactant (f1) | 3 | 3 | 3 | 3 | 3 | 3 |
| Mold release (f5) | 1 | 1 | 1 | 1 | 1 | 1 |
| Mold release (f7) | 3.5 | 3.5 | 3.5 | 3.5 | 3.5 | 3.5 |
| Isocyanate component | | | | | | |
| Polyisocyanate (II)[1] | 153 | 130 | 129 | 107 | 111 | 114 |
| Isocyanate index | 110 | 110 | 110 | 110 | 110 | 110 |
| Change in gel time (sec)[2] | | | | | | |
| Three weeks | — | 30 | 23 | 3 | 45 | 7 |
| Six months | 5 | — | — | 48 | — | 14 |

[1]Parts by weight of polyisocyanate (II) per 100 parts by weight of the NCO-reactive blend.
[2]Change in gel time relative to reaction after no storage of NCO-reactive blend.

Examples 32-40

Each of Examples 32-40 includes a base blend 4 containing the following components (parts by weight):

| | |
|---|---|
| Polyester (a4) | 15 parts |
| Polyether (a6) | 25 parts |
| Crosslinker (b1) | 60 parts |
| Flame retardant (d2) | 20 parts |
| Catalyst (e1) | 1.5 parts |
| Surfactant (f1) | 3 parts |
| Mold release (f5) | 1 part |
| Mold release (f7) | 3.5 parts |

Quantities of the remaining components and test results for Examples 32-40 are shown in Table 7.

TABLE 7

Compositions and results for Examples 32-40.

| Components (parts by weight) | \multicolumn{9}{c}{Examples} | | | | | | | | |
|---|---|---|---|---|---|---|---|---|---|
| | 32 | 33 | 34 | 35 | 36 | 37 | 38 | 39 | 40 |
| NCO-reactive blend[1] | | | | | | | | | |
| Chain extender (b2) | 3 | 3 | 3 | — | — | — | — | — | — |
| Amine polyether (c1) | — | — | — | — | — | — | 10 | 10 | 10 |
| Catalyst (e4) | — | 0.2 | — | — | — | 0.2 | — | — | 0.2 |
| Catalyst (e5) | 0.2 | — | — | 0.2 | — | — | 0.2 | — | — |
| Catalyst (e6) | — | — | 0.4 | — | 0.4 | — | — | 0.4 | — |
| Surfactant (f3) | 6 | — | — | — | 6 | — | — | — | 6 |
| Surfactant (f4) | — | — | 6 | — | — | 6 | 6 | — | — |
| Acid scavenger (f9) | — | — | 2 | 2 | — | — | — | — | 2 |
| Acid scavenger (f11) | — | 0.002 | — | — | 0.002 | — | 0.002 | — | — |
| Isocyanate component | | | | | | | | | |
| Polyisocyanate (II)[2] | 109 | 112 | 108 | 110 | 108 | 108 | 111 | 114 | 110 |
| Isocyanate index | 110 | 110 | 110 | 110 | 110 | 110 | 110 | 110 | 110 |
| Change in gel time (sec)[3] | | | | | | | | | |
| One week | 31 | 33 | 10 | 17 | 14 | 62 | 4 | 2 | 10 |
| Six months | — | — | — | — | — | — | — | 23 | 14 |

[1]Isocyanate-reactive blends also include base blend 4 (described above).
[2]Parts by weight of polyisocyanate (II) per 100 parts by weight of the NCO-reactive blend.
[3]Change in gel time relative to reaction after no storage of NCO-reactive blend.

Examples 32-40 were performed in accordance with the Taguchi method. The variable and corresponding levels (listed in increasing numeric order where appropriate) were as follows: amine type using none, extender (b2), and amine polyether (c1); surfactant type using none and surfactants (f4) and (f3); catalyst type using catalysts (e5), (e4), and (e6); and acid scavenger type using acid scavengers (f9) and (f10) and none. (Catalyst amounts were adjusted so that the reactivity profile was identical on day zero for all Examples. Acid scavenger levels were selected for known optimum effect.) Variance table analysis for the compositions shown in Table 7 (above) after one week storage are as follows:

| Variable | Level | | | Level sums* | | | Percent contribution** |
|---|---|---|---|---|---|---|---|
| | #1 | #2 | #3 | #1 | #2 | #3 | |
| Amine type | None | (b2) | (c1) | 186 | 153 | 35 | 37.1 |
| Surfactant type | None | (f4) | (f3) | 105 | 154 | 115 | 3.9 |
| Catalyst type | (e5) | (e4) | (e6) | 109 | 211 | 54 | 37.4 |
| Acid scavenger type | (f9) | (f10) | None | 76 | 106 | 192 | 21.4 |
| Error | | | | | | | 0.3 |

*Level sums are derived in the Taguchi analysis for each variable at levels #1, #2, and #3. The smaller of the level sum numbers for each variable indicates the more positive effect on shelf life.
**Percent contribution (rho) compares the percent contribution of each source of variation to the total.

The Taguchi analysis shows that amine type (including amine polyether (c1)) and catalyst type have the greatest effect on shelf-life stability in these Examples. Although, as expected, acid scavenger type has a significant effect on shelf-life stability, the effect is not as great as with polyether amine (c1). The analysis also shows that surfactant type has relatively little effect on shelf-life stability.

Example 41

Example 31 was repeated except for adding tertiary amine (c2). Quantities of components are shown in Table 8.

The change in gel time after six months (relative to a reaction carried out after no storage of the NCO-reactive blend) was 7 sec. That is, tertiary amine (c2) provides additional stabilization to blends containing amine polyether (c1) comparable to the stability of a blend containing no flame retardants (e.g., Example 26).

TABLE 8

Composition for Example 41.

| Components | Quantities (parts by weight) |
|---|---|
| NCO-reactive blend | |
| Polyester (a4) | 15 |
| Polyether (a6) | 25 |
| Crosslinker (b1) | 60 |
| Amine polyether (c1) | 10 |
| Tertiary amine (c2) | 6 |
| Flame retardant (d2) | 20 |
| Catalyst (e1) | 1.5 |
| Catalyst (e6) | 0.4 |
| Surfactant (f1) | 3 |
| Mold releasd (f5) | 1 |
| Mold release (f7) | 3.5 |
| Isocyanate component | |
| Polyisocyanate (II)[1] | 112 |
| Isocyanate index | 110 |

[1] Parts by weight of polyisocyanate (II) per 100 parts by weight of the NCO-reactive blend.

Examples 42–43

Example 43 illustrates a dramatic stabilizing effect of amine polyether (c1) on a rigid non-microcellular system based on an alternative amine-terminated polyether (a7) containing flame retardants. Example 42 is a comparison example containing no amine component (c1). Quantities of components and test results for Examples 42 and 43 are shown in Table 9.

TABLE 9

Compositions and results for Examples 42–43.

| Components (parts by weight) | Examples 42 | 43 |
|---|---|---|
| NCO-reactive blend | | |
| Polyester (a4) | 15 | 15 |
| Polyether (a7) | 25 | 25 |
| Crosslinker (b1) | 60 | 60 |
| Amine polyether (c1) | — | 10 |
| Flame retardant (d2) | 11 | 11 |
| Flame retardant (d3) | 11 | 11 |
| Catalyst (e1) | 1.5 | 1.5 |
| Catalyst (e6) | 0.4 | 0.4 |
| Surfactant (f2) | 3 | 3 |
| Mold release (f5) | 1 | 1 |
| Hold release (f7) | 3.5 | 3.5 |
| Isocyanate component | | |
| Polyisocyanate (II)[1] | 110 | 113 |
| Isocyanate index | 110 | 110 |
| Change in gel time (sec)[2] | | |
| One week | 80 | 3 |

[1] Parts by weight of polyisocyanate (II) per 100 parts by weight of the NCO-reactive blend.
[2] Change in gel time relative to reaction after no storage of NCO-reactive blend.

Examples 44–54

Spray Systems

Isocyanate-reactive blends were prepared in a fifty-kilogram container by adding the components in the sequence (a), (b), (c), (f), (d), and finally (e) (with catalysts normally being added last). The isocyanate-reactive blends were mixed for a total of 30 minutes (or about 15 minutes after the last component was added). Isocyanate prepolymer blends were prepared by adding flame retardant (d7) or (d8) to the isocyanate prepolymer. The isocyanate prepolymer blends were mixed for 30 minutes under a nitrogen atmosphere. The isocyanate-reactive blends were allowed to stand for a minimum of twelve hours after being mixed and were then mixed with the isocyanate prepolymers at the isocyanate indexes shown in the Tables. Mixing was carried out in a spray gun equipped with a static or impingement mixer using spray equipment having a metering pump. Spraying was carried out at a temperature of 60° C. and a spray pressure of 10 MPa. The materials were generally sprayed to a thickness of 3 to 4 mm onto a mirrored surface or a polyethylene sheet from which the sprayed polyurethane could release easily.

For laboratory gel time experiments, a fifty gram sample of the isocyanate-reactive blend was mixed with an isocyanate prepolymer blend at 25° C. in equal volumes or at a volumetric ratio of four parts of the tsocyanate-reactive blend for each three parts of the polyisocyanate. Mixing was carried out using Servodyne electronic mixer (Cole Palmer Instrument Company) equipped with a constant speed stirrer. Gel time was determined by observing the time at which voltage across the stirrer (which is proportional to viscosity) crossed the 50 mV level (which corresponds to a viscosity of 13500 cps and to the time at which the polyurethane starts to form gel strings when an applicator stick is plunged into and out of the mixture). Gel time results were reproducible to within 7 to 12 seconds, depending on the amount of filler in the system.

Examples 44–49

Examples 44–49 were carried out in the absence of tertiary amine of ammonium compounds corresponding to component (c), both with and without flame retardants, for purposes of comparison. The reaction procedure and gel time determinations were carried out on the day after the isocyanate-reactive blends were prepared. When no signs of gelling were observed within 300 seconds, the blends were considered to have deteriorated with complete loss of reactivity within 24 hours. Quantities of components and test results for Examples 44–49 are shown in Table 10.

TABLE 10

Compositions and results for Examples 44–49.

| Components (parts by weight) | 44 | 45 | 46 | 47 | 48 | 49 |
|---|---|---|---|---|---|---|
| NCO-reactive blend | | | | | | |
| Polyether (a8) | 6 | 6 | 6 | 6 | 6.0 | 4.8 |
| Polyether (a9) | 86.6 | 86.6 | — | — | — | — |
| Polyether (a10) | — | — | — | — | 39 | 39 |
| Polyether (a11) | — | — | 86.6 | 86.6 | — | — |
| Crosslinker (b3) | — | — | — | — | 47.7 | 47.7 |
| Chain extender (b4) | 2.3 | 2.3 | 2.3 | 2.3 | 2.3 | 2.3 |
| Flame retardant (d2) | — | — | — | 13.1 | — | 13.1 |
| Flame retardant (d3) | — | — | — | 13.1 | — | 13.1 |
| Flame retardant (d6) | — | 68.3 | — | — | — | — |
| Catalyst (e7) | 0.23 | 0.23 | 0.23 | 0.23 | 0.23 | 0.23 |
| Water scavenger (f13) | 5.75 | 5.75 | 5.75 | 5.75 | 5.75 | 5.75 |
| Defoamer (f14) | 0.1 | 0.1 | 0.1 | 0.1 | 0.1 | 0.1 |
| Isocyanate component | | | | | | |
| Prepolymer (III) | 100 | 100 | 100 | 70 | 100 | 100 |
| Flame retardant (d10) | — | — | — | 30 | — | — |
| Isocyanate index | 93 | 115 | 93 | 95 | 93 | 100 |
| Volume ratio[1] | 3:4 | 3:4 | 3:4 | 3:4 | 3:4 | 3:4 |
| Gel data | | | | | | |
| Gel time (sec) | 43 | 486 | 55 | >300 | 54 | >300 |
| Complete loss of | No | Yes | No | Yes | No | Yes |

TABLE 10-continued

Compositions and results for Examples 44–49.

| Components (parts by weight) | Examples | | | | | |
|---|---|---|---|---|---|---|
| | 44 | 45 | 46 | 47 | 48 | 49 |
| reactivity? | | | | | | |

(1)Volume ratio is the volumetric ratio of the amount of the isocyanate component to the amount of the NCO-reactive blend.

Examples 44 to 49 show that the presence of flame retardants (d2), (d3), (d6), and (d10) causes a complete loss in shelf-life stability.

Examples 50–54

Examples 51–54 were carried out in the presence of tertiary amine component (c1) in the presence of various flame retardants. Comparative Example 50 was carried out in the same manner as Example 51 except that the tertiary amine component (c1) was omitted. The reaction procedures and gel time determinations were carried out on the day after the isocyanate-reactive blends were prepared and again after storage at 23°–25° C. for two weeks and four or more weeks. Quantities of components and test results for Examples 50–54 are shown in Table 11.

TABLE 11

Compositions and results for Examples 50–54.

| Components (parts by weight) | Examples | | | | |
|---|---|---|---|---|---|
| | 50 | 51 | 52 | 53 | 54 |
| NCO-reactive blend | | | | | |
| Polyether (a8) | 3.3 | 3.3 | 3.5 | 4.2 | 4.2 |
| Polyether (a10) | 21.5 | 21.5 | 22.6 | 27.3 | 27.3 |
| Crosslinker (b3) | 26.2 | 26.2 | 27.7 | 33.4 | 33.4 |
| Chain extender (b4) | 1.3 | 1.3 | 1.3 | 1.6 | 1.6 |
| Amine polyether (c1) | — | 10 | 10 | 10 | 10 |
| Flame retardant (d2) | — | — | 10 | 10 | 10 |
| Flame retardant (d3) | — | — | 10 | 10 | 10 |
| Flame retardant (d6) | 45 | 45 | 12 | — | — |
| Catalyst (e3) | 0.06 | 0.06 | 0.05 | 0.05 | — |
| Catalyst (e7) | 0.13 | 0.13 | 0.14 | 0.17 | 0.17 |
| Water scavenger (f13) | 2.6 | 2.6 | 2.8 | 3.3 | 3.3 |
| Defoamer (f14) | 0.06 | 0.06 | 0.06 | 0.07 | 0.07 |
| Isocyanate component | | | | | |
| Prepolymer (III) | 65 | 65 | 65 | 65 | 70 |
| Flame retardant (d7) | 35 | 35 | 35 | 35 | 30 |
| Isocyanate index | 105 | 98 | 105 | 110 | 110 |
| Volume ratio(1) | 3:4 | 3:4 | 1:1 | 1:1 | 1:1 |
| Change in gel time (sec)(2) | | | | | |
| Two weeks | — | 3 | 5 | 8 | 10 |
| Four weeks | >120 | 8 | 7 | 10 | — |

(1)Volume ratio is the volumetric ratio of the amount of the isocyanate component to the amount of the NCO-reactive blend.
(2)Change in gel time relative to reaction after no storage of NCO-reactive blend.

Examples 50 to 54 show that amine polyether (c1) significantly improves shelf-life stability.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane containing a flame retardant prepared by the isocyanate addition reaction, at an isocyanate index of from 80 to 130 in the absence of a blowing agent, of an organic polyisocyanate with a storage-stable isocyanate-reactive composition comprising
    (a) 10 to 90 percent by weight, based on the total of components (a), (b), (c), (d), and (e), of at least one isocyanate-reactive compound having a molecular weight of 400 to 10,000 and a functionality of 2 to 7;
    (b) 0.6 to 67 percent by weight, based on the total of components (a), (b), (c), (d), and (e), of at least one isocyanate-reactive compound having a molecular weight of less than 399 and a functionality of 2 to 6;
    (c) 0.7 to 30 percent by weight, based on the total of components (a), (b), (c), (d), and (e), of a tertiary amine or ammonium compound selected from the group consisting of
        (i) an isocyanate-reactive tertiary amine polyether having a molecular weight of from 100 to 1000 and having the formula $$R[NR^1R^2]_m$$

wherein
        R is saturated or unsaturated $C_2$-$C_8$ aliphatic or $C_2$-$C_8$ aliphatic substituted with —OH, —SH, or NHR$^a$ wherein R$^a$ is $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH, or NHR$^a$ wherein R$^a$ is alkyl or alkenyl; or five- or six-membered aromatic or heteroaromatic optionally substituted with $C_1$-$C_8$ alkyl, $C_1$-$C_8$ alkoxy, halogen, cyano, nitro, $C_1$-$C_8$ alkylene, —OH, —SH, or NHR$^a$ wherein R$^a$ is $C_1$-$C_8$ alkyl or $C_2$-$C_8$ alkenyl;
        $R^1$ and $R^2$ are independently polyether groups terminated with isocyanate-reactive groups selected from —OH, —SH, and NHR$^b$ wherein R$^b$ is $C_1$-$C_8$ alkyl or $C_2$-$C_8$ alkenyl; and
        m is an integer of from 1 to 4;
        (ii) a fatty amido-amine;
        (iii) an ammonium salt derivative of a fatty amido-amine; and
        (iv) mixtures thereof;
    (d) 5 to 55 percent by weight, based on the total of components (a), (b), (c), (d), and (e), of a flame retardant;
    (e) 0.007 to 6 percent by weight, based on the total of components (a), (b), (c), (d), and (e), of a catalyst selected from tertiary amines, organic metal compounds, and mixtures thereof; and
    (f) 0 to 15 percent by weight, based on the total of components (a), (b), (c), (d), and ( e ), of additives.

2. A polyurethane according to claim 1 wherein isocyanate-reactive compound (a) has a functionality of 2 to 4.

3. A polyurethane according to claim 1 wherein isocyanate-reactive compound (b) has a functionality of 2 to 4.

4. A polyurethane according to claim 1 wherein component (c) is an isocyanate-reactive amine polyether (c)(i) or a combination of said isocyanatereactive amine polyether (c)(i) with a smaller amount of a fatty amido-amine (c)(ii) and/or an ammonium salt derivative of a fatty amido-amine (c)(iii).

5. A polyurethane according to claim 1 wherein component (c) is an isocyanate-reactive amine polyether having a molecular weight of 200 to 600 and having the formula $$R[NR^1R^2]_2$$

wherein R is a difunctional saturated $C_2$-$C_8$ aliphatic group and $R^1$ and $R^2$ are independently hydroxy-terminated polyethers containing exclusively polypropylene oxide units, or a combination of said isocyanate-reactive amine polyether with a smaller amount of a fatty amido-amine (c)(ii) and/or an ammonium salt derivative of a fatty amido-amine (c)(iii).

6. A rigid non-microcellular urethane-based product containing a flame retardant prepared by the isocyanate addition reaction, at an isocyanate index of from 100 to 120 in the absence of a blowing agent, of an organic polyisocyanate with a storage-stable isocyanate-reactive composition comprising
  (a) 18 to 57 percent by weight, based on the total of components (a), (b), (c), (d), and (e), of at least one isocyanate-reactive compound having a molecular weight of 400 to 10,000 and a functionality of 2 to 7;
  (b) 28 to 67 percent by weight, based on the total of components (a), (b), (c), (d), and (e), of at least one isocyanate-reactive compound having a molecular weight of less than 399 and a functionality of 2 to 6;
  (c) 1.4 to 27 percent by weight, based on the total of components (a), (b), (c), (d), and (e), of a tertiary amine or ammonium compound selected from the group consisting of
    (i) an isocyanate-reactive tertiary amine polyether having a molecular weight of from 100 to 1000 and having the formula $$R[NR^1R^2]_m$$

wherein
  R is saturated or unsaturated $C_2$-$C_8$ aliphatic or $C_2$-$C_8$ aliphatic substituted with —OH, —SH, or $NHR^a$ wherein $R^a$ is $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH, or $NHR^a$ wherein $R^a$ is alkyl or alkenyl; or five- or six-membered aromatic or heteroaromatic optionally substituted with $C_1$-$C_8$ alkyl, $C_1$-$C_8$ alkoxy, halogen, cyano, nitro, $C_1$-$C_8$ alkylene, —OH, —SH, or $NHR^a$ wherein $R^a$ is $C_1$-$C_8$ alkyl or $C_2$-$C_8$ alkenyl;
  $R^1$ and $R^2$ are independently polyether groups terminated with isocyanate-reactive groups selected from —OH, —SH, and $NHR^b$ wherein $R^b$ is $C_1$-$C_8$ alkyl or $C_2$-$C_8$ alkenyl; and
  m is an integer of from 1 to 4;
    (ii) a fatty amido-amine;
    (iii) an ammonium salt derivative of a fatty amido-amine; and
    (iv) mixtures thereof;
  (d) 10 to 38 percent by weight, based on the total of components (a), (b), (c), (d), and (e), of a flame retardant; p1 (e) 0.07 to 3.5 percent by weight, based on the total of components (a), (b), (c), (d), and (e), of a catalyst selected from tertiary amines, organic metal compounds, and mixtures thereof; and
  (f) 0 to 15 percent by weight, based on the total of components (a), (b), (c), (d), and (e), of additives.

7. A urethane-based non-microcellular product according to claim 6 wherein component (a) comprises a polyamine or aminocrotonate-terminated polyether and component (c) comprises 3 to 24 percent by weight of an isocyanate-reactive tertiary amine polyether (c)(i) and, optionally, 0.7 to 14 percent by weight of a fatty amido-amine (c)(ii).

8. A urethane-based non-microcellular product according to claim 6 wherein component (a) comprises an isocyanate-reactive compound other than a polyamine or aminocrotonate-terminated polyether and component (c) comprises 3 to 24 percent by weight of an isocyanate-reactive tertiary amine polyether (c)(i) and, optionally, 3 to 24 percent by weight of an ammonium salt derivative of a fatty amido-amine (c)(iii).

9. A non-microcellular urethane-based elastomer containing a flame retardant prepared by the isocyanate addition reaction, at an isocyanate index of from 90 to 110 in the absence of a blowing agent, of an organic polyisocyanate with a storage-stable isocyanate-reactive composition comprising
  (a) 32 to 90 percent by weight, based on the total of components (a), (b), (c), (d), and (e), of at least one isocyanate-reactive compound having a molecular weight of 400 to 10,000 and a functionality of 2 to 7;
  (b) 0.7 to 38 percent by weight, based on the total of components (a), (b), (c), (d), and (e), of at least one isocyanate-reactive compound having a molecular weight of less than 399 and a functionality of 2 to 6;
  (c) 1.4 to 27 percent by weight, based on the total of components (a), (b), (c), (d), and (e), of a tertiary amine or ammonium compound selected from the group consisting of
    (i) an isocyanate-reactive tertiary amine polyether having a molecular weight of from 100 to 1000 and having the formula $$R[NR^1R^2]_m$$

wherein
  R is saturated or unsaturated $C_2$-$C_8$ aliphatic or $C_2$-$C_8$ aliphatic substituted with —OH, —SH, or $NHR^a$ wherein $R^a$ is $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH, or $NHR^a$ wherein $R^a$ is alkyl or alkenyl; or five- or six-membered aromatic or heteroaromatic optionally substituted with $C_1$-$C_8$ alkyl, $C_1$-$C_8$ alkoxy, halogen, cyano, nitro, $C_1$-$C_8$ alkylene, —OH, —SH, or $NHR^a$ wherein $R^a$ is $C_1$-$C_8$ alkyl or $C_2$-$C_8$ alkenyl;
  $R^1$ and $R^2$ are independently polyether groups terminated with isocyanate-reactive groups selected from —OH, —SH, and $NHR^b$ wherein $R^b$ is $C_1$-$C_8$ alkyl or $C_2$-$C_8$ alkenyl; and
  m is an integer of from 1 to 4;
    (ii) a fatty amido-amine;
    (iii) an ammonium salt derivative of a fatty amido-amine; and
    (iv) mixtures thereof;
  (d) 20 to 48 percent by weight, based on the total of components (a), (b), (c), (d), and (e), of a flame retardant;
  (e) 0.07 to 3.5 percent by weight, based on the total of components (a), (b), (c), (d), and (e), of a catalyst selected from tertiary amines, organic metal compounds, and mixtures thereof; and (f) 0 to 15 percent by weight, based on the total of components (a), (b), (c), (d), and (e), of additives.

10. A urethane-based non-microcellular elastomer according to claim 9 wherein component (a) comprises a polyamine or aminocrotonate-terminated polyether and component (c) comprises 3 to 24 percent by weight of an isocyanatereactive tertiary amine polyether (c)(i) and, optionally, 0.7 to 14 percent by weight of a fatty amido-amine (c)(ii).

11. A urethane-based non-microcellular elastomer according to claim 9 wherein component (a) comprises an isocyanate-reactive compound other than a polyamine or aminocrotonate-terminated polyether and component (c) comprises 3 to 24 percent by weight of an isocyanate-reactive tertiary amine polyether (c)(i) and, optionally, 3 to 24 percent by weight of an ammonium salt derivative of a fatty amido-amine (c)(iii).

12. A polyurethane containing a flame retardant applied to a substrate by spraying a mixture comprising an organic polyisocyanate and a storage-stable isocyanate-reactive composition mixed at an isocyanate index of from 90 to 120 in the absence of a blowing agent, said storage-stable isocyanate-reactive composition comprising (a) 10 to 75 percent by weight, based on the total of components (a), (b), (c), (d), and (e), of at least one isocyanate-reactive compound having a molecular weight of 400 to 10,000 and a functionality of 2 to 7;

(b) 1 to 50 percent by weight, based on the total of components (a), (b), (c), (d), and (e), of at least one isocyanate-reactive compound having a molecular weight of less than 399 and a functionality of 2 to 6;

(c) 5 to 15 percent by weight, based on the total of components (a), (b), (c), (d), and (e), of a tertiary amine or ammonium compound selected from the group consisting of (i) an isocyanate-reactive tertiary amine polyether having a molecular weight of from 100 to 1000 and having the formula

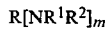

$R[NR^1R^2]_m$ wherein

R is saturated or unsaturated $C_2$-$C_8$ aliphatic or $C_2$-$C_8$ aliphatic substituted with —OH, —SH, or $NHR^a$ wherein $R^a$ is $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH, or $NHR^a$ wherein $R^a$ is alkyl or alkenyl; or five- or six-membered aromatic or heteroaromatic optionally substituted with $C_1$-$C_8$ alkyl, $C_1$-$C_8$ alkoxy, halogen, cyano, nitro, $C_1$-$C_8$ alkylene, —OH, —SH, or $NHR^a$ wherein $R^a$ is $C_1$-$C_8$ alkyl or $C_2$-$C_8$ alkenyl;

$R^1$ and $R^2$ are independently polyether groups terminated with isocyanate-reactive groups selected from —OH, —SH, and $NHR^b$ wherein $R^b$ is $C_1$-$C_8$ alkyl or $C_2$-$C_8$ alkenyl; and m is an integer of from 1 to 4;

(ii) a fatty amido-amine;

(iii) an ammonium salt derivative of a fatty amido-amine; and (iv) mixtures thereof;

(d) 5 to 55 percent by weight, based on the total of components (a), (b), (c), (d), and (e), of a flame retardant;

(e) 0.01 to 1.5 percent by weight, based on the total of components (a), (b), (c), (d), and (e), of a catalyst selected from tertiary amines, organic metal compounds, and mixtures thereof; and (f) 0 to 15 percent by weight, based on the total of components (a), (b), (c), (d), and ( e ), of additives.

13. A polyurethane according to claim 12 wherein component (c) comprises 6 to 10 percent by weight of an isocyanate-reactive tertiary amine polyether (c)(i).

* * * * *